United States Patent [19]
Davis

[11] Patent Number: 6,085,452
[45] Date of Patent: Jul. 11, 2000

[54] METHOD AND APPARATUS FOR MARKING A LOCATION

[76] Inventor: R.P. Stephen Davis, 434 Mammoth Oaks Dr., Charlotte, N.C. 28270

[21] Appl. No.: 08/763,607

[22] Filed: Dec. 11, 1996

[51] Int. Cl.⁷ .............................. G09F 15/00; G01C 15/06
[52] U.S. Cl. .................................. 40/606; 33/293; 33/294; 40/610; 40/607; 52/103; 116/209; 248/530; 248/533
[58] Field of Search ...................... 33/293, 294; 40/605, 40/606, 607, 612, 645, 598, 610, 659, 637, 661.11, 368, 611; 52/103; 116/209; 248/530, 533; 47/44, 47; 403/292; 446/108, 111, 112, 113, 115, 122

[56] References Cited

U.S. PATENT DOCUMENTS

| | | |
|---|---|---|
| 363,206 | 5/1887 | Burgess, Jr. . |
| 1,814,380 | 7/1931 | Gredell ....................................... 40/645 |
| 2,186,428 | 1/1940 | Patten ........................................ 40/645 |
| 2,660,822 | 12/1953 | Hargus ...................................... 52/103 |
| 2,872,750 | 2/1959 | Holcomb . |
| 2,970,396 | 2/1961 | Worrell ..................................... 40/605 |
| 3,057,093 | 10/1962 | Gallo . |
| 3,386,323 | 6/1968 | Dovey ..................................... 83/440.1 |
| 3,469,335 | 9/1969 | Leigh ........................................ 40/607 |
| 4,100,698 | 7/1978 | Fries ............................................ 47/29 |
| 4,250,647 | 2/1981 | Woodard .............................. 40/607 X |
| 4,433,490 | 2/1984 | Black ................................... 52/103 X |
| 4,647,491 | 3/1987 | Ireland et al. .......................... 428/137 |
| 4,658,527 | 4/1987 | Pingel . |
| 4,660,310 | 4/1987 | Farmer . |
| 4,793,083 | 12/1988 | McDonald ............................... 40/607 |
| 4,885,860 | 12/1989 | Huenefeld ................................ 40/606 |
| 4,894,937 | 1/1990 | Davis . |
| 5,042,183 | 8/1991 | Kennedy .................................. 40/607 |
| 5,226,748 | 7/1993 | Barenwald et al. .................... 405/121 |
| 5,251,996 | 10/1993 | Hiller et al. ......................... 403/406.1 |
| 5,293,705 | 3/1994 | Wood .................................... 40/124.1 |
| 5,307,580 | 5/1994 | Farmer ...................................... 40/606 |
| 5,375,355 | 12/1994 | Rhoads ..................................... 40/612 |
| 5,408,950 | 4/1995 | Porto ....................................... 116/239 |
| 5,671,584 | 9/1997 | Mueller ..................................... 52/780 |

OTHER PUBLICATIONS

Illustration of flagging stake.
"The Surveyor's Step Stake" Order Form.

*Primary Examiner*—Terry Lee Melius
*Assistant Examiner*—Andrea Chop
*Attorney, Agent, or Firm*—Kennedy Covington Lobdell & Hickman

[57] ABSTRACT

A device and method for marking a location with a marker stake. An elongate wire-like rod is partially inserted in the ground at a location to be marked, and the rod is received in a pre-sized panel having a pair of flag faces and an open-ended longitudinal channel, the channel being dimensioned to receive the rod in friction fit. The flag faces are separated by a plurality of spacers in generally parallel orientation to each other, with the spacers defining the plurality of channels, and the panel has two longitudinal ends each having a sighting notch. While inserting the rod into the ground, the panel may be disposed at the ground to serve as a guide to retain the rod against deflection. Two or more panels and rods may be joined together to produce a larger marker stake, and the panels may be oriented at right angles to each other to give the marker stake a greater three-dimensional profile.

11 Claims, 16 Drawing Sheets

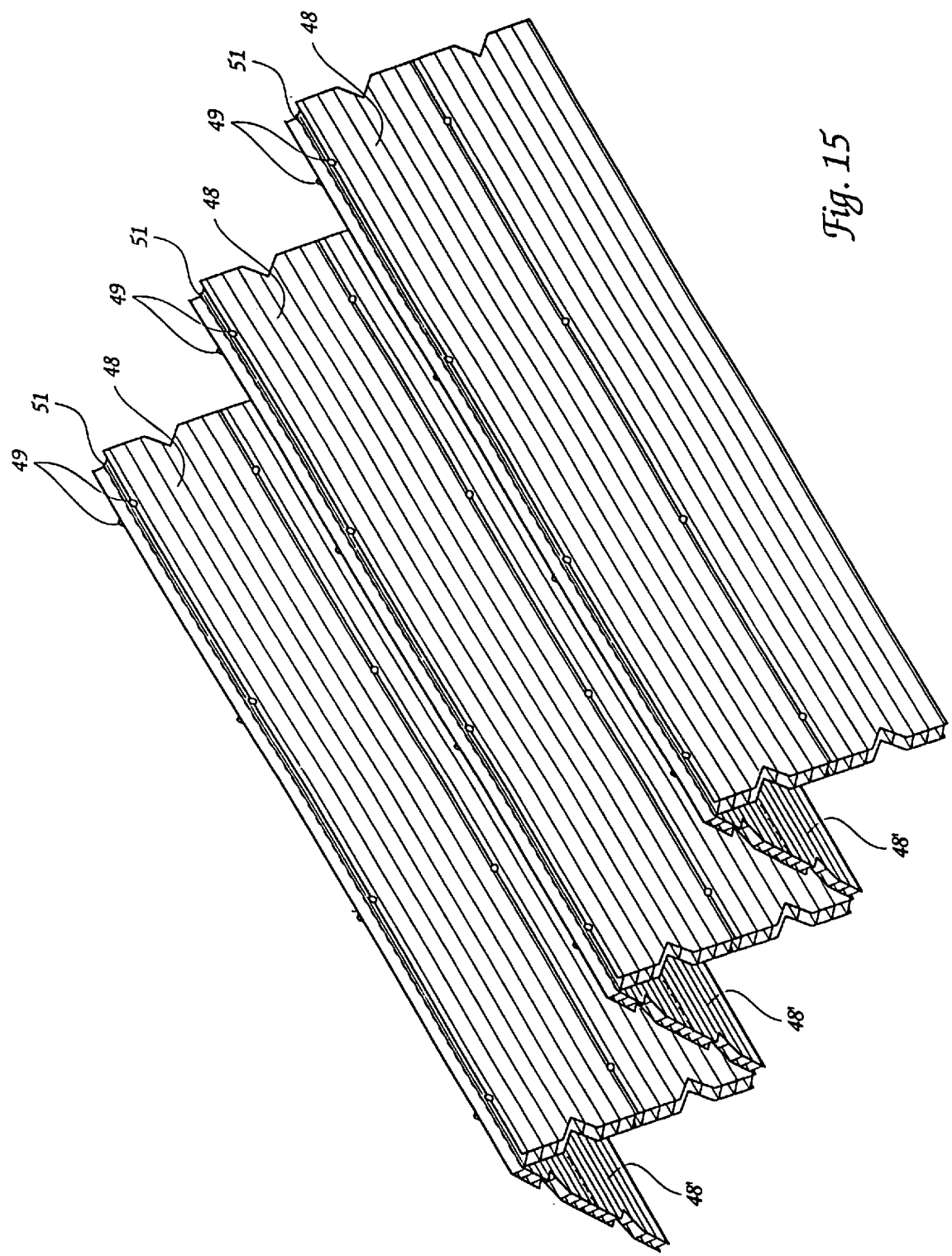

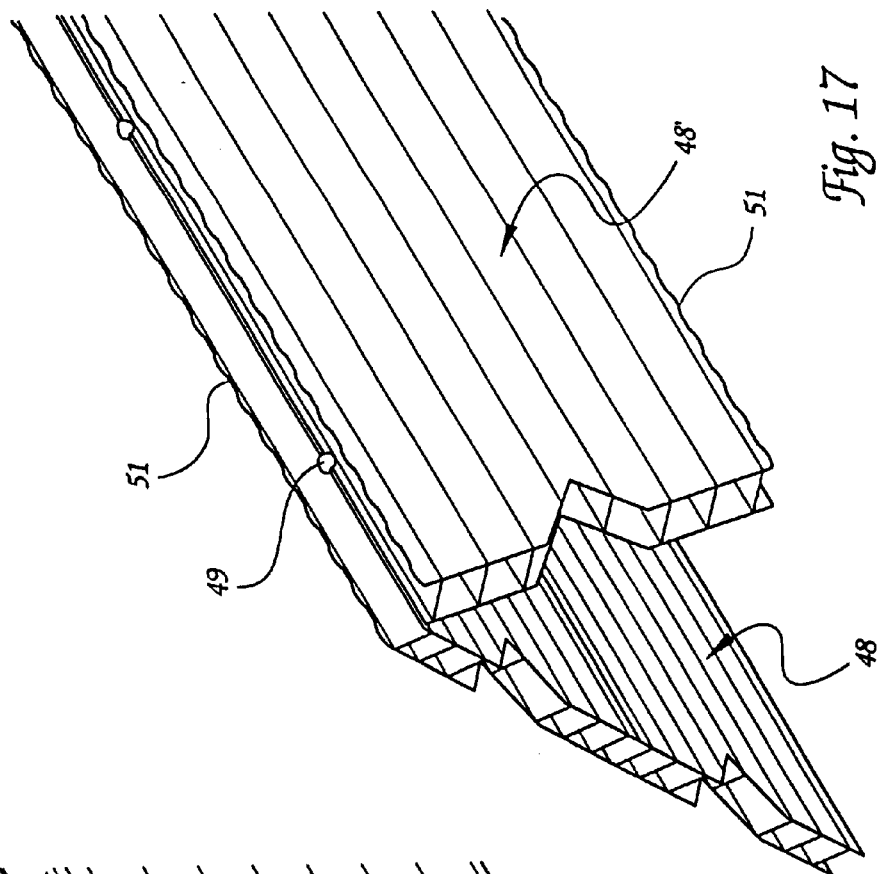
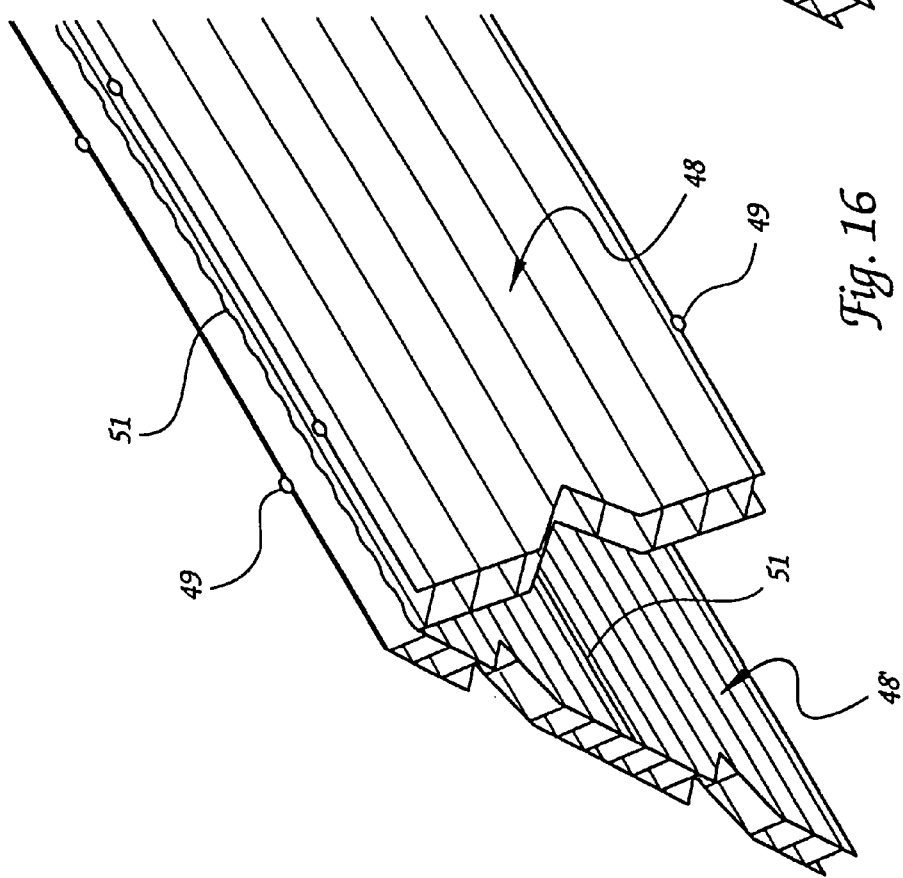

METHOD AND APPARATUS FOR MARKING A LOCATION

BACKGROUND OF THE INVENTION

The present invention relates generally to a device and method for marking a point or location for surveying, construction, or other purposes and, more particularly, to a compact, readily transportable marker stake which can be easily deployed at a location to be marked.

Practitioners in numerous professions, including surveyors, construction workers, graders, and excavators, have a need for a convenient, accurate and easy way to mark a particular point or location. Reliable marking is essential for surveying property lines, collecting data for map-drawing, layout of buildings, grading or removing of earth, and many other tasks. The primary method of marking locations for such purposes has been, for many years, to drive a wooden stake at the location and to mark the stake with paint or a colored tape to make the stake more visible.

The use of wooden stakes has several significant drawbacks. To install such a stake securely, it must almost always be driven into the ground with a hammer, and the process of hammering a stake is time-consuming and can lead to painful hammer miss-hits on the hand. Installing a wooden stake in asphalt is most often impossible, in that the stake will splinter or split if struck with enough force to drive it into asphalt. In most situations a number of points must be marked, often with the points some distance from each other, so that a number of wooden stakes must be carried over the distance involved and installed by hammering them into the ground in order to complete the marking. A bundle of stakes, which ordinarily comprises 50 stakes, presents a bulky, heavy and cumbersome load which will not provide enough stakes to complete marking of a complex property line or other project, so that another bundle or bundles must be obtained before the project can be completed. Moreover, such wooden stake bundles are often held together only by plastic strapping, and once the strapping is cut the bundle collapses and becomes difficult to control and carry.

Wooden stakes present further disadvantages in that they are, by themselves, not readily visible since the light color of the wood used (often pine, fir, or the like) readily blends in with the environment and weathers over time to become even more inconspicuous. Consequently, the previously mentioned methods of painting or attaching tape to the stake ordinarily must be employed, although both of these approaches have drawbacks. Painting requires that paint be brought along during the marking process, which can often involve walking long distances for a survey, and when the paint runs out the process may be interrupted so that more paint can be obtained. If a scheme of different colors is to be used to mark different types of locations, different paints must of course be available as locations are marked. Moreover, painting of stakes adds a significant amount of time to the surveying or layout process. Tape tied on stakes can easily become detached from the stake, making the stake difficult to locate when it is needed for reference. The added step of having to cut and tie the tape on stakes also slows down marking operations to a large degree.

Attempts have been made to address the problems of wooden stakes, but all known attempts suffer from various disadvantages. Thin, highly flexible metal wire with a tape flag has been used to mark locations in light excavating applications, such as where buried power lines or other objects must be marked and avoided. However, such wires do not provide sufficient stability for surveying, layout or grading applications, where accuracy is required, and the flags can readily become detached from the metal wire.

The StepStake, a product covered by U.S. Pat. No. 4,894,937, comprises a 9 gauge galvanized steel section of masonry reinforcing grid and a flag of polypropylene plastic board. Two legs of the grid are inserted into the ground, and the plastic flag is installed on two upwardly projecting legs of the grid. The StepStake represents a significant advancement over the wooden stake, but it is not configured for easy hammering into hard surfaces such as asphalt, has a limited insertion depth because of cross-pieces in the grid which resist insertion into the ground, does not provide for a centered sighting pin for surveyors, and still involves some bulk and weight when bundled for transportation.

The present invention provides a device and method for marking locations which avoid or eliminate the aforesaid limitations of conventional approaches. It provides a device and method for easy and safe installation in hard surfaces, even in asphalt; is extremely lightweight and makes possible compact packaging of a large number of marker stakes; and allows utilization of a centered sighting pin for highly accurate surveying.

SUMMARY OF THE INVENTION

In accordance with the present invention, a device and method are provided for easily marking locations for surveying, construction, or other purposes. The device of the present invention comprises an elongate wire-like rod for partial insertion into the ground at a location to be marked, and a pre-sized panel which has a pair of flag faces and an open-ended longitudinal channel which is dimensioned to receive in friction fit a portion of the rod. The pair of flag faces may be separated by two or more spacers in generally parallel orientation, with the spacers defining the channel.

The flag faces may be in generally parallel orientation to each other and the panel may include a plurality of spacers defining a plurality of channels which are in generally parallel orientation to each other, and the faces may be sufficiently rigid so that they can maintain a readily visible surface for sighting thereon. The rod may advantageously include transverse grooves spaced along its longitudinal length for maintaining the friction fit of the rod in the channel and may also include gripping projections along the longitudinal length of the rod.

One of the ends of the rod may be a ground insertable end, and the panel may be slidably disposable at the ground insertable end of the rod to retain the rod against deflection while the rod is inserted into the ground, with the panel being slidable to dispose it at a marking disposition after the rod is inserted into the ground.

The channel for receiving the rod may be centrally located in the panel. The panel may have a longitudinal end which is, when the rod is received in the channel, distally disposed with respect to the ground insertable end, and the longitudinal end may have a sighting notch formed inwardly therein and centered on the channel. The other end of the rod may be a sighting end, and the rod may be slidably received in the channel so as to position the sighting end of the rod in the sighting notch to facilitate sighting on the rod. The panel may also have two longitudinal ends, each having a sighting notch therein, both sighting notches being centered on the channel.

In accordance with another aspect of the invention, the device of the invention may have first and second rods, each having two ends, with the first rod partially insertable into the ground at a location to be marked, first and second panels, each having a pair of flag faces and an open-ended longitudinal channel capable of receiving in friction fit a portion of the longitudinal length of the first or second rod. The panels may each have two longitudinal ends in generally parallel orientation, with each of the longitudinal ends having a notch formed therein and the notches being centered on the channel. The first panel may receive a portion of the first rod and a portion of the second rod in its channel, the second panel may receive a portion of the second rod in its channel, and the panels may be disposed adjacent at respective longitudinal ends thereof with their flag faces in right angle orientation about the second rod, with the panels being retained in right angle orientation by interengagement of the notches in the adjacent ends of the panels. It may be advantageous if the flag faces of each panel are separated by two or more spacers in generally parallel orientation, with the spacers defining the channel in each panel.

In accordance with a further aspect of the invention, the present invention may have first and second rods, each having two ends, with the first rod partially insertable into the ground at a location to be marked, first and second panels, each having a pair of flag faces and at least two open-ended longitudinal channels capable of receiving in friction fit a portion of the longitudinal length of the first or second rod. The panels may each have two longitudinal ends in generally parallel orientation, with each of the longitudinal ends having a notch formed therein and each of the notches being centered on one of the channels. The first panel may receive a portion of the first rod in one of its channels and a portion of the second rod in another of its channels, the second panel may receive a portion of the second rod in one of its channels, and the panels may disposed adjacent at respective longitudinal ends thereof with their flag faces in right angle orientation about the second rod, with the panels being retained in right angle orientation by interengagement of the notches in the adjacent ends of the panels. It may be advantageous if the flag faces of each panel are separated by at least three spacers in generally parallel orientation, with the spacers defining the channels in each panel.

In accordance with another aspect, the present invention may comprise a set of rods and panels for assembling into marker stakes for marking locations, including a bundle of wire-like rods each having two ends, with each of the rods insertable into the ground at a location to be marked, and a plurality of pre-sized panels, each panel having a pair of flag faces and an open-ended longitudinal channel which is dimensioned to receive in friction fit a portion of the longitudinal length of one of the rods, the panels being joined together at their lateral sides by spaced separable connecting tabs so that they can be easily separated for placing the panels individually on the rods to form marker stakes, the joined panels being in the form of a sheet foldable in accordion fashion for compact fashion prior to being separated. The flag faces may also be separated by two or more spacers in generally parallel orientation, with the spacers defining the channel in the panel.

In accordance with an aspect of the present invention, the present invention includes a method of inserting a marker stake in the ground at a location, the marker stake including a wire-like rod having a ground insertable end and a sighting end and a pre-sized panel having a pair of flag faces and an open-ended longitudinal channel dimensioned for receiving in friction fit a portion of the longitudinal length of the rod, the method including inserting the rod in the channel and slidably disposing the panel at the ground insertable end of the rod, positioning the rod with its ground insertable end at the location to be marked, partially inserting the rod into the ground at the location so as to firmly anchor the rod in the ground, the channel retaining the rod against deflection, and sliding the panel along the rod to position the panel at a marking disposition at the sighting end of the rod for sighting thereon.

In accordance with another aspect, the present invention includes a method for inserting a marker stake in the ground for sighting thereon, the panel having a longitudinal sighting end having a sighting notch formed inwardly therein, the sighting notch being centered on the channel, the method comprising inserting the rod in the channel of the panel, positioning the rod with its ground insertable end at the location to be marked, partially inserting the rod into the ground at the location to firmly anchor the rod in the ground, and positioning the sighting end of the rod within the notch of the panel for sighting thereon.

In accordance with a further aspect, the present invention includes a method of inserting a marker stake at a location to be marked, the marker stake including a first rod having a ground insertable end and an opposite end, and a second rod having an insertable end and a sighting end, first and second pre-sized panels each having a pair of flag faces, two or more open-ended channels dimensioned to receive in friction fit a portion of the length of one of said rods, and two longitudinal ends in generally parallel orientation, each of the ends having a notch formed therein and centered on one of the channels, the method comprising inserting the first rod into one of the channels in the first panel, positioning the first rod with its ground insertable end at the location to be marked, partially inserting the first rod into the ground to firmly anchor the rod, positioning the first panel at the opposite end of the first rod, inserting the insertable end of the second rod in another of the channels of the first panel and the sighting end of the second rod in one of the channels of the second panel in right angle orientation with respect to the first panel about the second rod, the notches of the adjacent ends of the first panel and the second panel being in interengagement to retain the first and second panels in right angle orientation.

BRIEF DESCRIPTION OF THE DRAWINGS

FIG. 15 is a perspective view of a portion of the sheet of panels of FIG. 11 in a partially folded disposition;

FIGS. 16 and 17 are enlarged perspective views of portions of the sheet of panels of FIG. 15 showing partial separation of the connecting elements joining the panels of the sheet together;

DESCRIPTION OF THE PREFERRED EMBODIMENT

Figure 1:
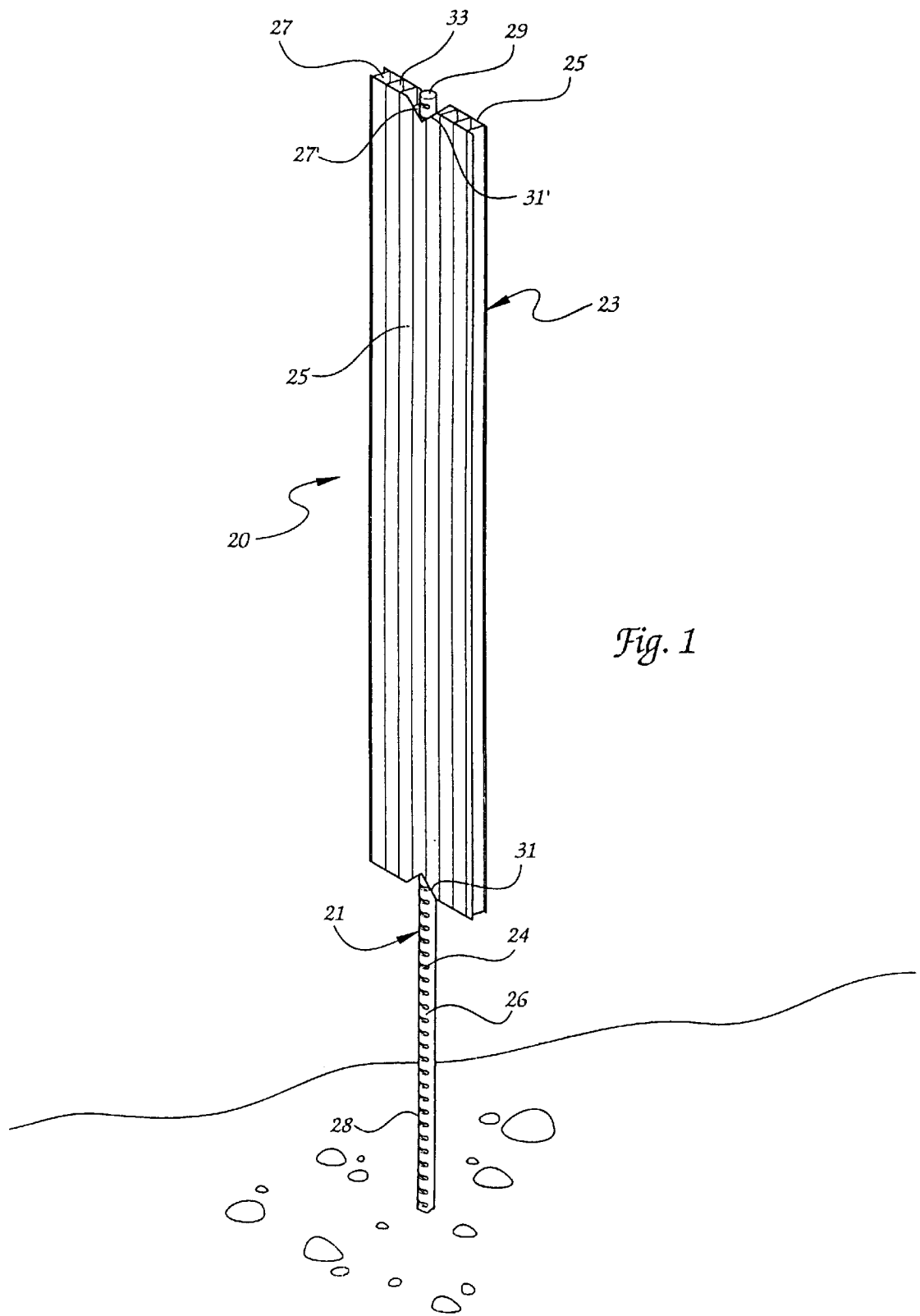
FIG. 1 is a perspective view of a marker stake embodying the present invention installed in the ground to mark a location.

Referring to the accompanying drawings, FIG. 1 illustrates in perspective view the marking stake 20 of the present invention installed at a location to be marked. The marking stake 20 of FIG. 1 consists of a rod 21 and a panel 23 mounted thereon. Rod 21 is inserted into the ground at the point to be marked, with panel 23, having flag faces 25, receiving a portion of rod 21 in channel 27'. Ground insertable end 28 of rod 21 is securely installed in the ground, while sighting end 29 of rod 21 protrudes through sighting notch 31' to provide a target for sighting upon with a transit theodolite or the like. It should be noted that ground, as used herein, is used to designate a surface having a location to be marked, and is not intended to be limited to earth or soil, but can include asphalt and the like, as well as earth.

Rod 21 is preferably formed from a length of 9 gauge galvanized steel masonry reinforcing rod, such as is commonly available from steel supply sources. A typical length for rod 21 is twenty inches, although of course many variations in length are possible to suit various applications. In the preferred embodiment, the rod 21 has transverse grooves 24 formed therein, with the grooves 24 being spaced along the longitudinal length of the rod 21 to thereby form gripping projections 26. Grooves 24 thus provide the rod 21 with a surface having a varied contour to provide additional frictional resistance for assisting in maintaining the rod 21 in its installed position in the ground and in the desired position in the channel 27' of the panel 23.

Panel 23 is preferably formed from conventional extruded polypropylene, and can be produced in bright, highly visible colors, such as pink, yellow, orange, red, etc., including any of the eight standard colors designated by the American Public Works Association for identifying features found in surveys, such as gas lines, electric cables, and the like. The color dye of the panel is integral to the polypropylene and therefore present throughout the thickness of the material, and is additionally fade-resistant.

Figure 4:
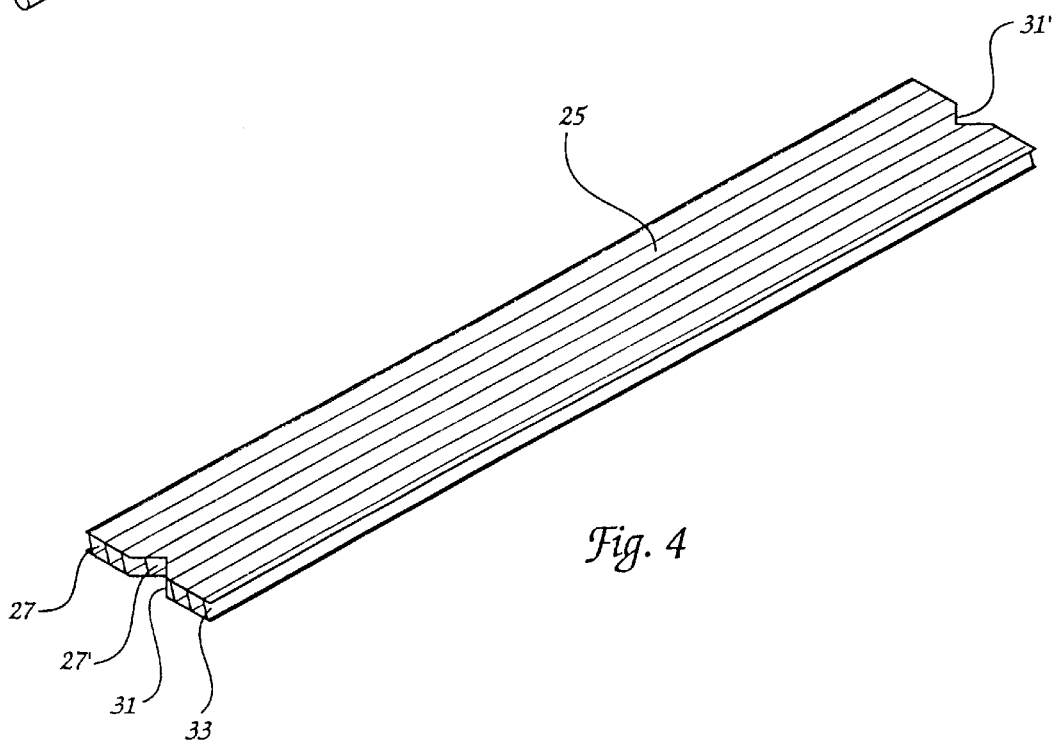
FIG. 4 is a perspective view of the panel of the marker stake of FIG. 1.

Panel 23 has two flag faces 25 for high visibility, with the typical dimensions of the flag faces being ten inches by one and one-half inches, although other configurations are of course possible. Spacers 33, which are in generally parallel orientation as seen in FIGS. 1 and 4, are located between flag faces 25 and are arrayed to form channels 27 and center channel 27'. Spacers 33 are dimensioned and arranged so that channels 27 and 27' are sized for receiving rod 21 in a friction fit which allows adjusting movement of rod 21, but which also prevents slippage and keeps panel 23 in a stable position on rod 21. Spacers 33 are preferably formed so that they are in generally parallel orientation to each other, although they may be formed in many different variations, including typical corrugated panel configurations.

Figure 2:
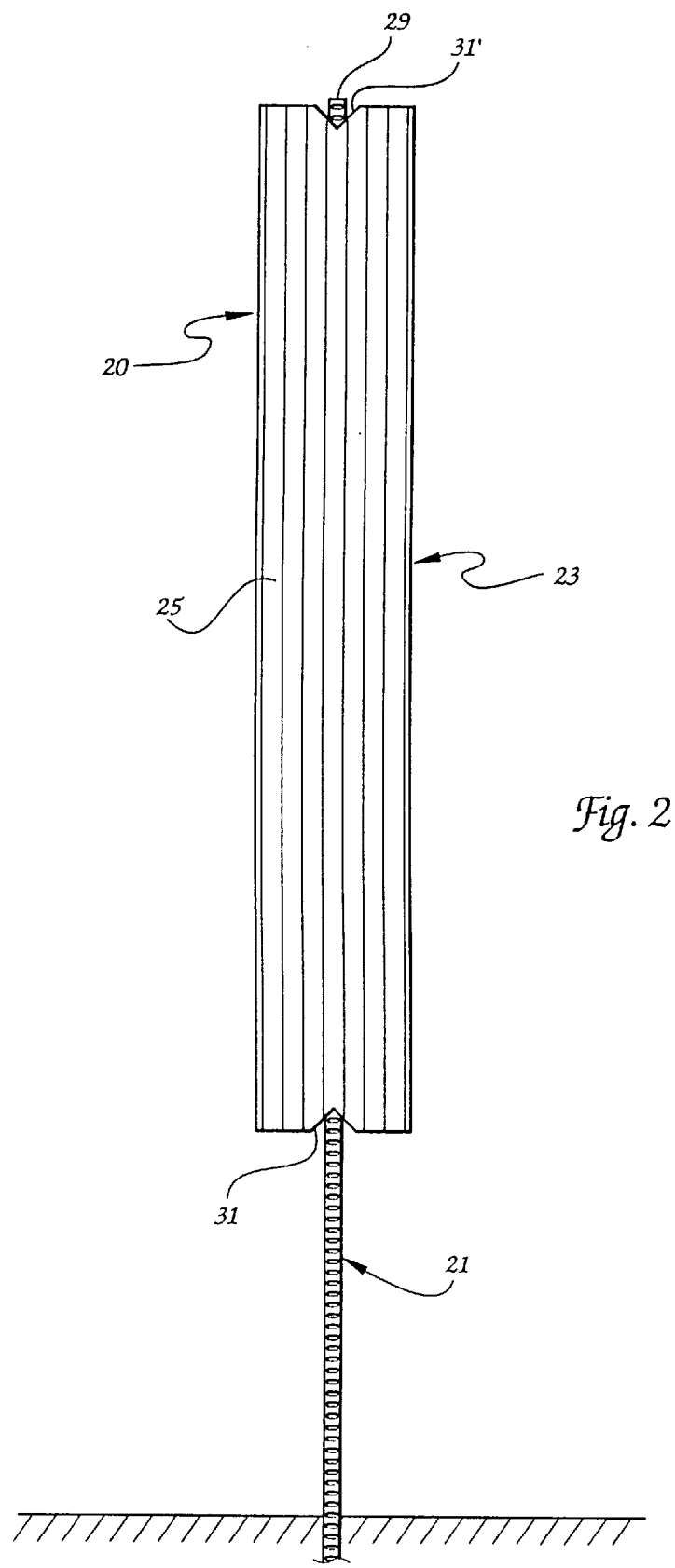
FIG. 2 is an elevational view of the marker stake of FIG. 1.
Figure 3:
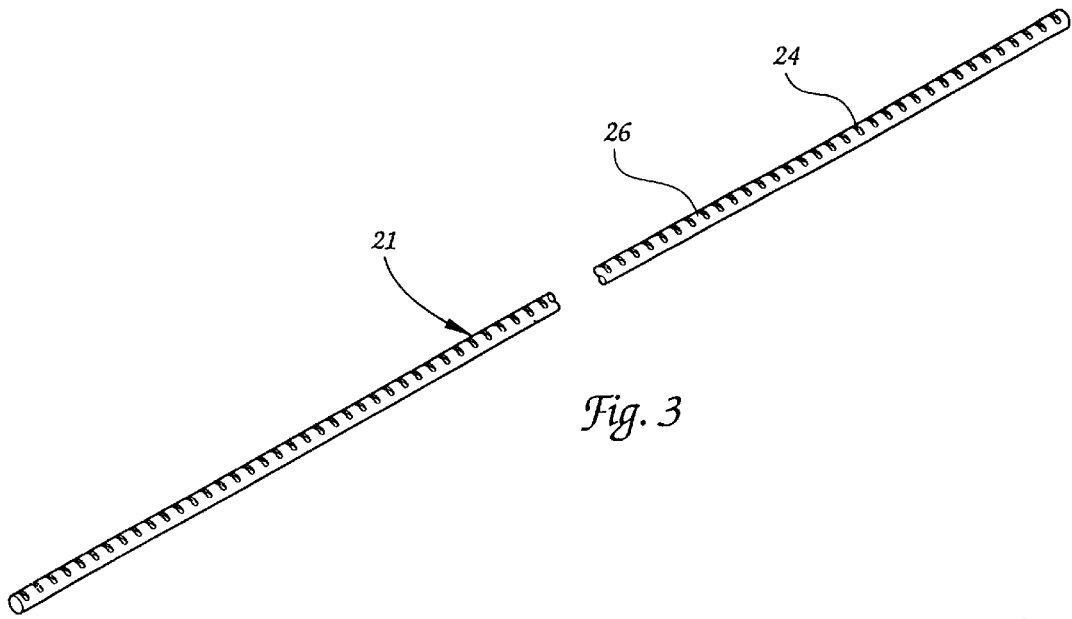
FIG. 3 is a partial perspective view of the rod of the marker stake of FIG. 1.

Sighting notches 31 and 31' are formed in the longitudinal ends of panel 23, with center channel 27' being preferably centered in notches 31 and 31'. Sighting end 29 of rod 21 can therefore be disposed in channel 27' so that it extends into the center of sighting notch 31' to provide a readily-found reference point, as shown in FIGS. 1 and 2.

Figure 7:
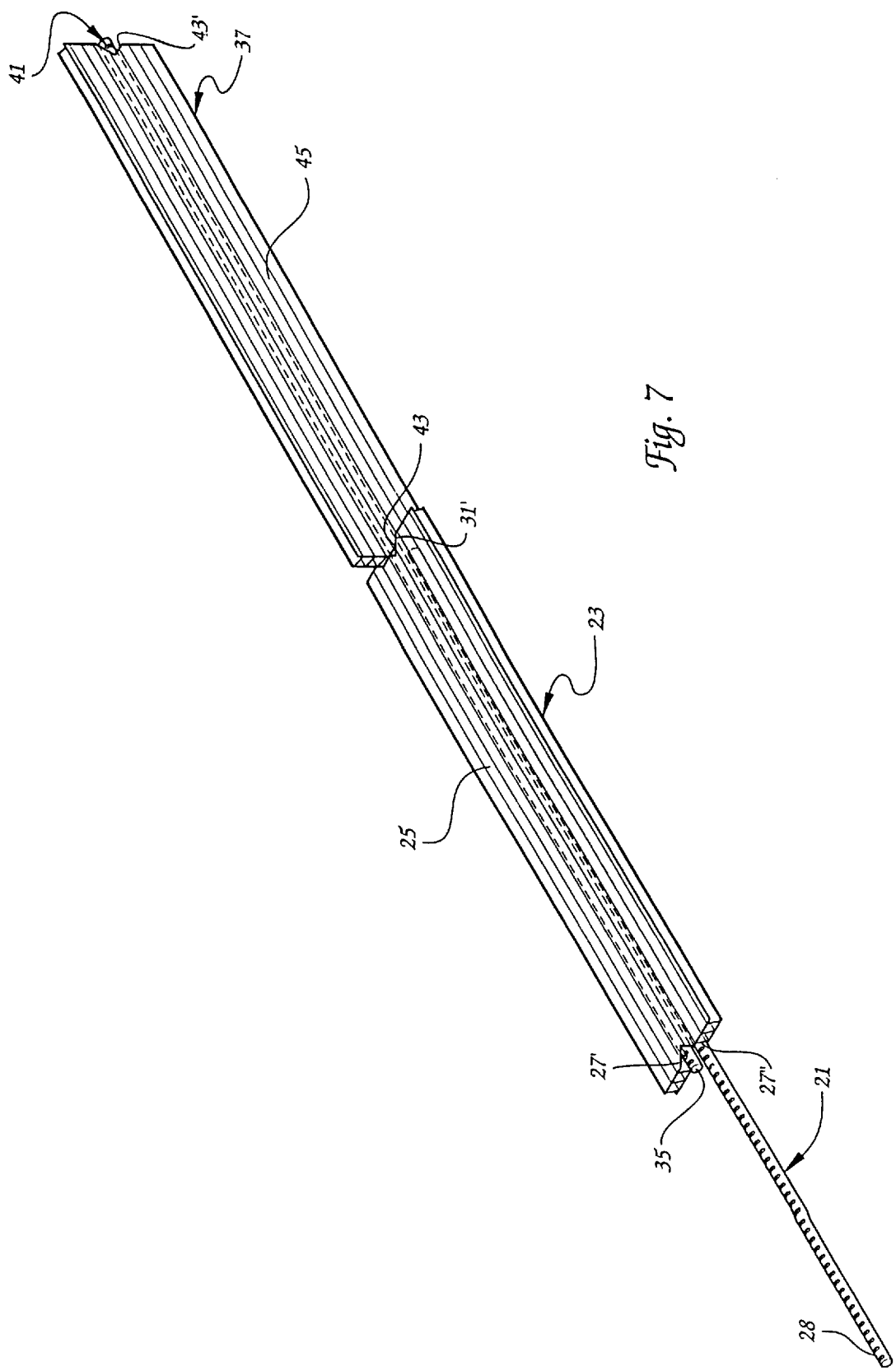
FIG. 7 is a perspective view of a marker stake of an embodiment of the present invention which consists of two panels and two rods.
Figure 9:
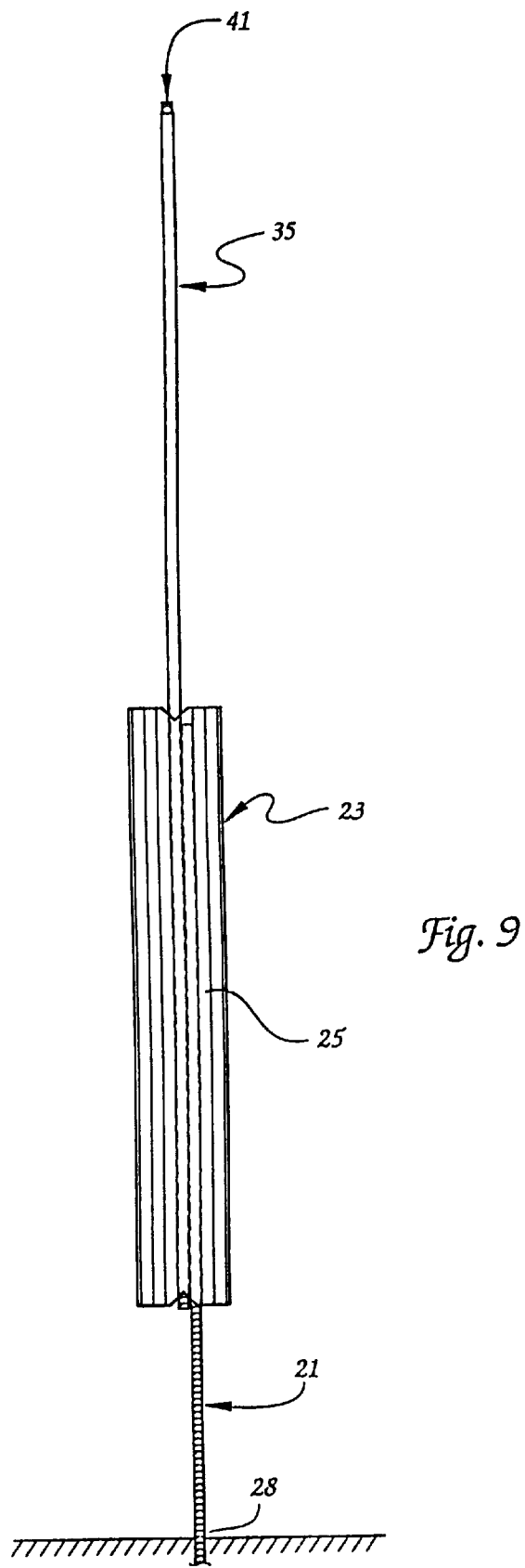
FIG. 9 is an elevation of the marker stake of FIG. 7.
Figure 10:
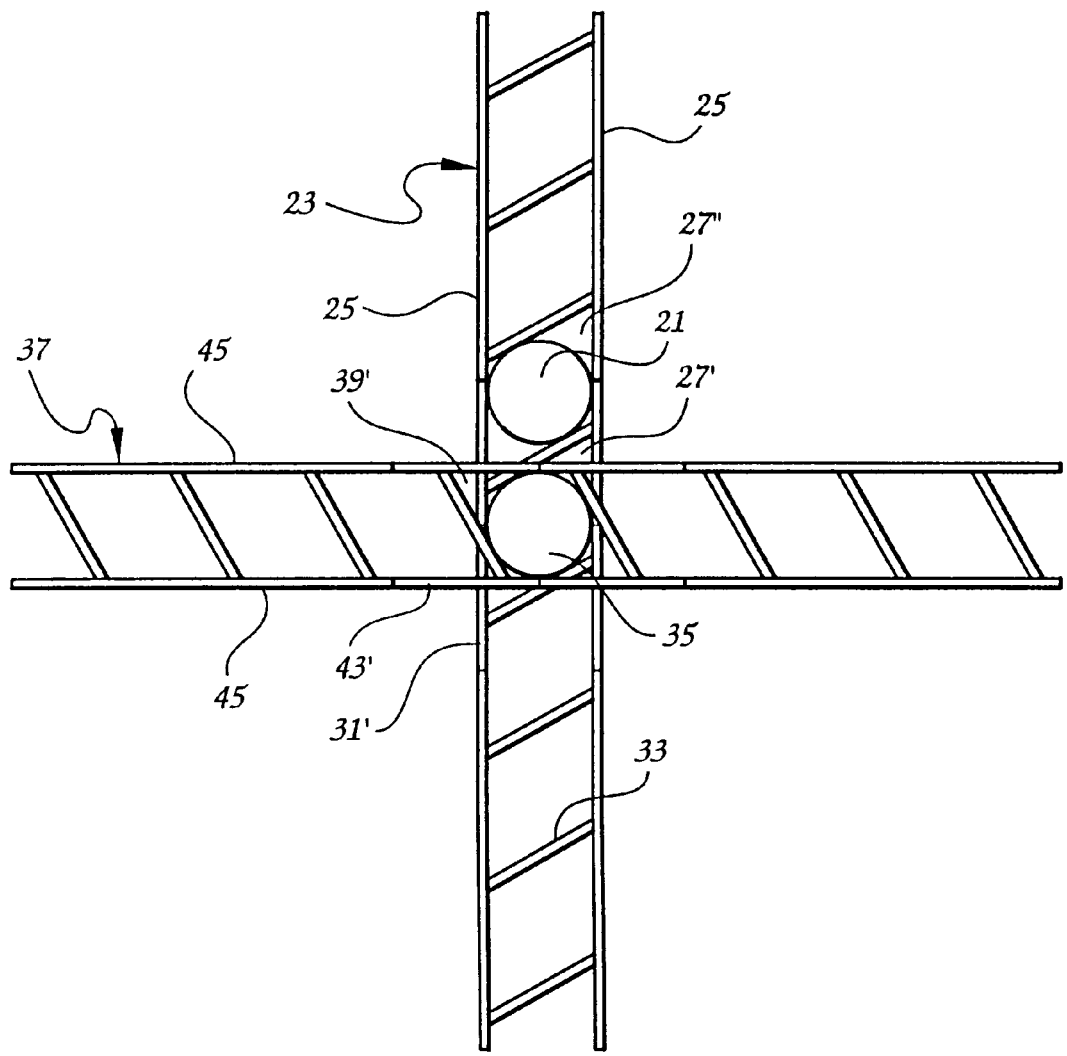
FIG. 10 is a plan view of the marker stake of FIG. 7.

It may be desirable to assemble a marker stake which consists of two or more panels and rods, so as to make the marker stake more visible or to bring the height of the stake up to a certain level. As shown in FIGS. 7, 9, and 10, two or more rods and panels may be joined together to produce a marker stake of greater height. Ground insertable end 28 of a first rod 21 is installed in the ground, and a first panel 23 is disposed on rod 21. However, rod 21 is not received in channel 27' of panel 23, but rather in an adjacent channel 27". An end of a second rod 35 is received in channel 27' of the first panel 23, with a portion of the longitudinal extent of the second rod 35 projecting upward to be received in channel 39' of a second panel 37. Sighting end 41 of the second rod 35 projects into sighting notch 43' of the second panel 37 to provide a target for sighting thereon.

As shown in FIGS. 7 and 10, flag faces 25 of the first panel 23 are oriented at right angles with respect to flag faces 45 of the second panel 37. Sighting notch 31' of the first panel 23 and sighting notch 43 of the second panel 37 are interlocked to provide additional stability to the combined marker stake. In FIG. 10 the marker stake is seen from above looking downward at the top of the stake, and the position of rod 21 in channel 27" of the first panel 23, and the second rod 35 in channel 39' of the second panel 37 and in channel 27' of the first panel 23 is shown.

Figure 8:
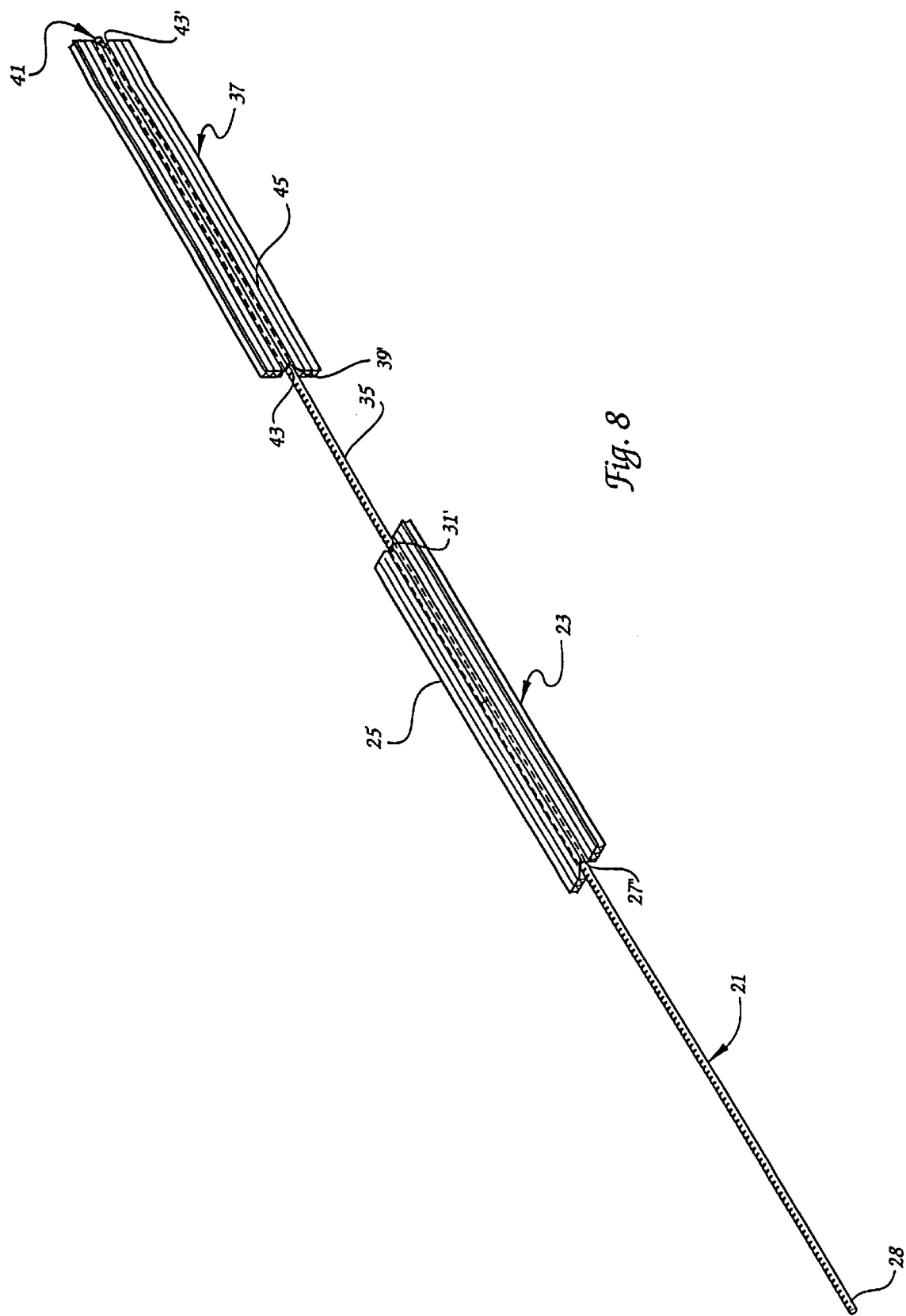
FIG. 8 is a perspective view of another embodiment of the present invention which consists of two panels and two rods.

Marker stakes having two panels may be joined as shown in FIG. 8. A first rod 21 is partially inserted in channel 27" of a first panel 23 and one end of a second rod 35 is also inserted into channel 27", while the other end of a second rod 35 is inserted into channel 39' of a second panel 37.

Figure 11:
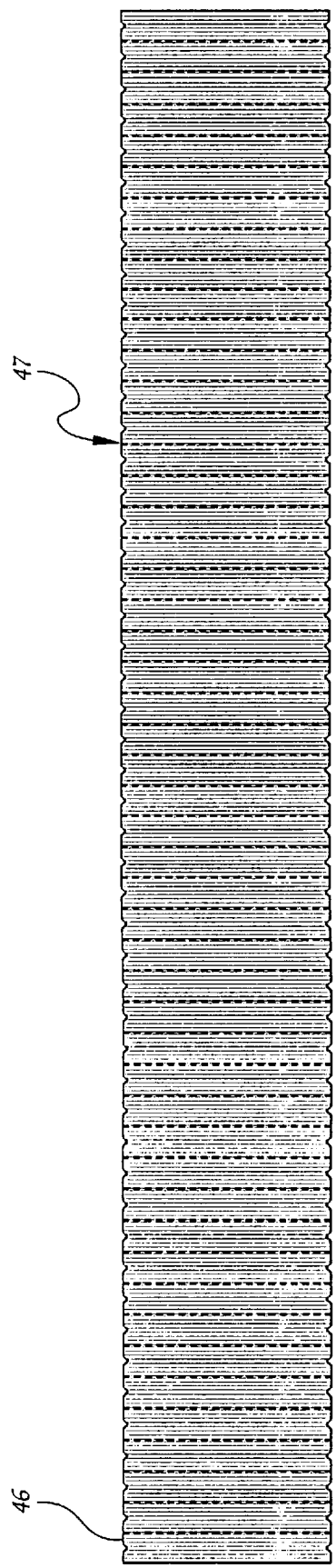
FIG. 11 is an elevational view of a sheet of panels embodying the present invention.
Figure 12:
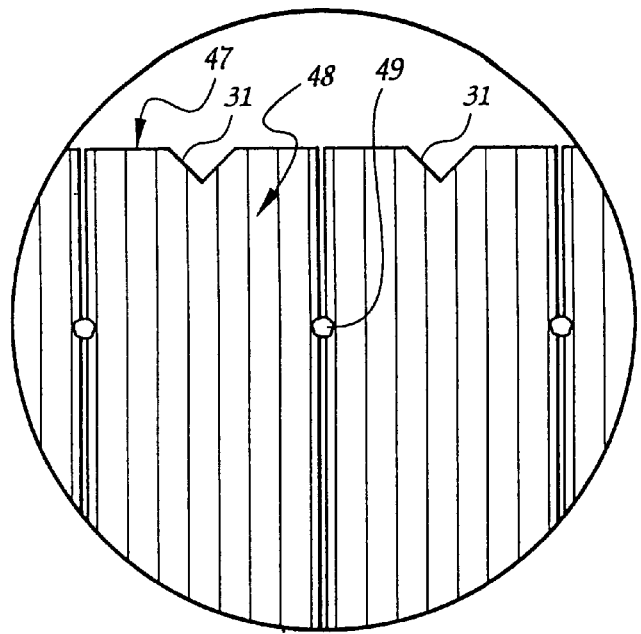
FIGS. 12 and 13 are enlarged detailed views of portions of the sheet of panels of FIG. 11 showing the joining of the panels forming the sheet.
Figure 13:
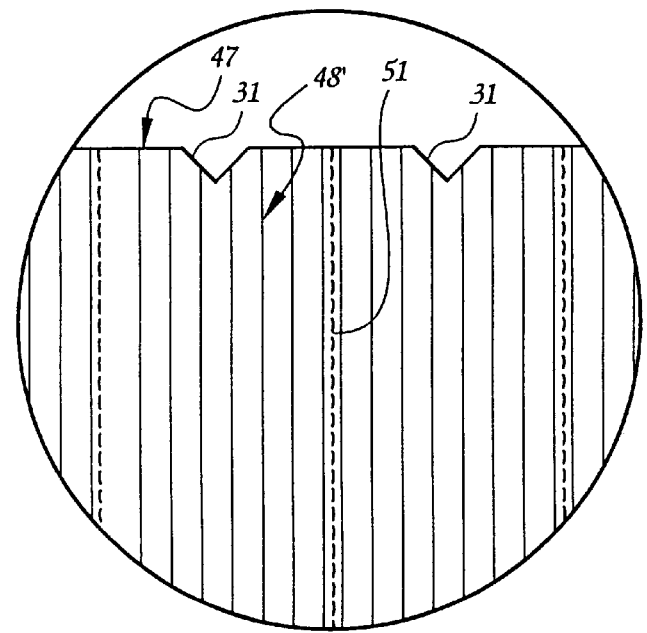

A sheet 47 consisting of individual panels 46 is shown in FIG. 11 with panels 46 joined together at their lateral edges. Sheet 47 is preferably formed from a continuous sheet of extruded polyethylene cut to size and scored to form panels 46. The arrangement by which panels 46 are joined is shown in FIGS. 12 and 13, and consists of tabs 49 at the edge joints on one side 48 of sheet 47, and perforated portions 51 at the edge joints on the other side 48' of sheet 47. Both tabs 49 and perforated portions 51 form spaced connecting elements formed by scoring of sheet 47, with tabs 49 being substantially spaced for ease of separation, while perforated portions 51 are spaced more closely to assist folding of sheet 47.

Figure 14:
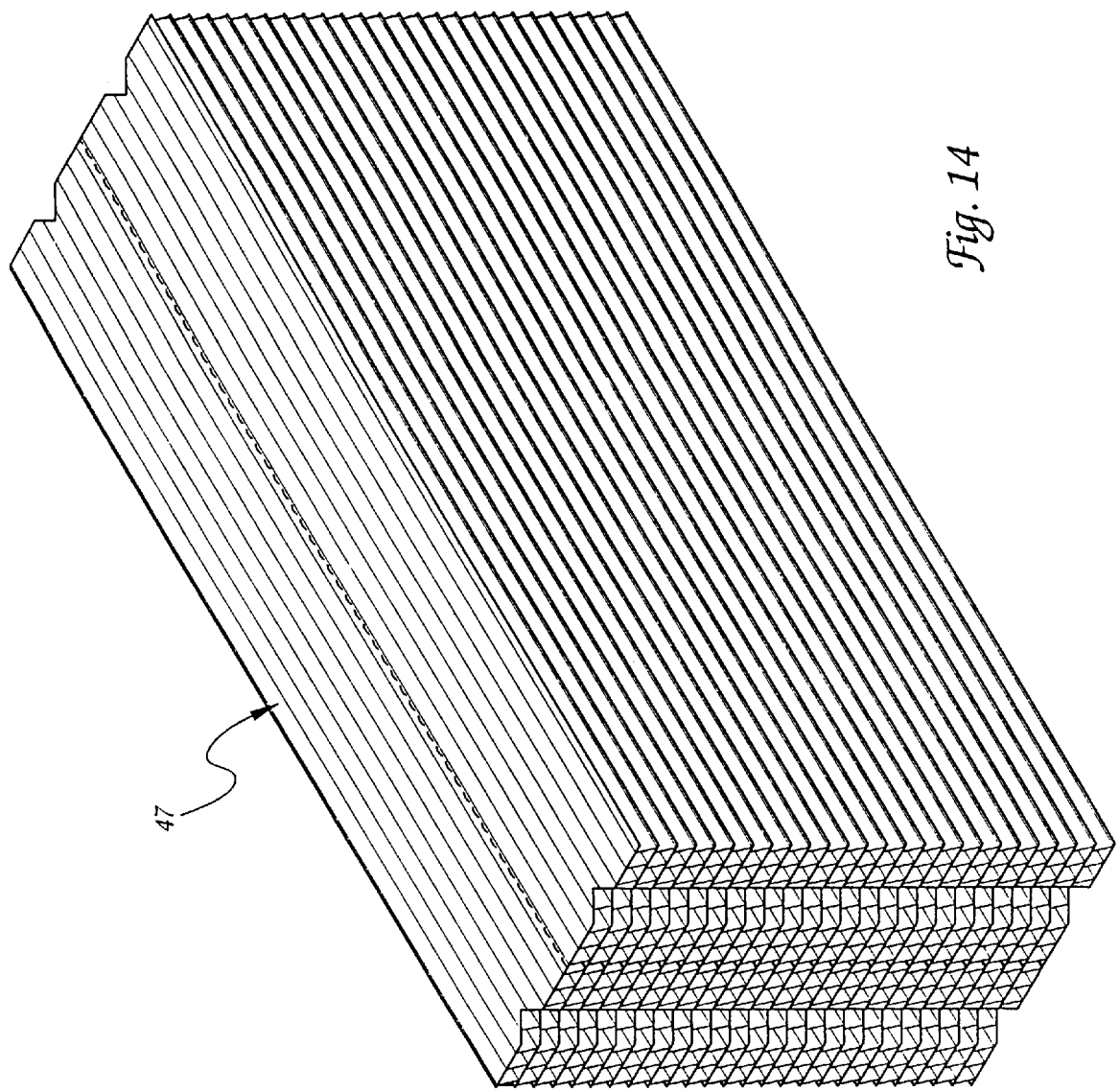
FIG. 14 is a perspective view of the sheet of panels of FIG. 11 in a folded disposition.

Sheet 47 is shown in FIG. 14 in its folded disposition, and in FIG. 15 in a partially unfolded disposition. FIG. 16 illustrates separation of tabs 49 on side 48 of sheet 47 to allow folding of sheet 47, while FIG. 17 illustrates how perforated portions 51 on side 48' of sheet 47 separate to allow folding. To fold sheet 47, it is not necessary that tabs 49 or perforated portions 51 separate completely when they are, as shown respectively in FIGS. 16 and 17, along the outside edge of the fold, and consequently some continued attachment of tabs 49 or perforated portions 51 does not impede folding.

Figure 18:
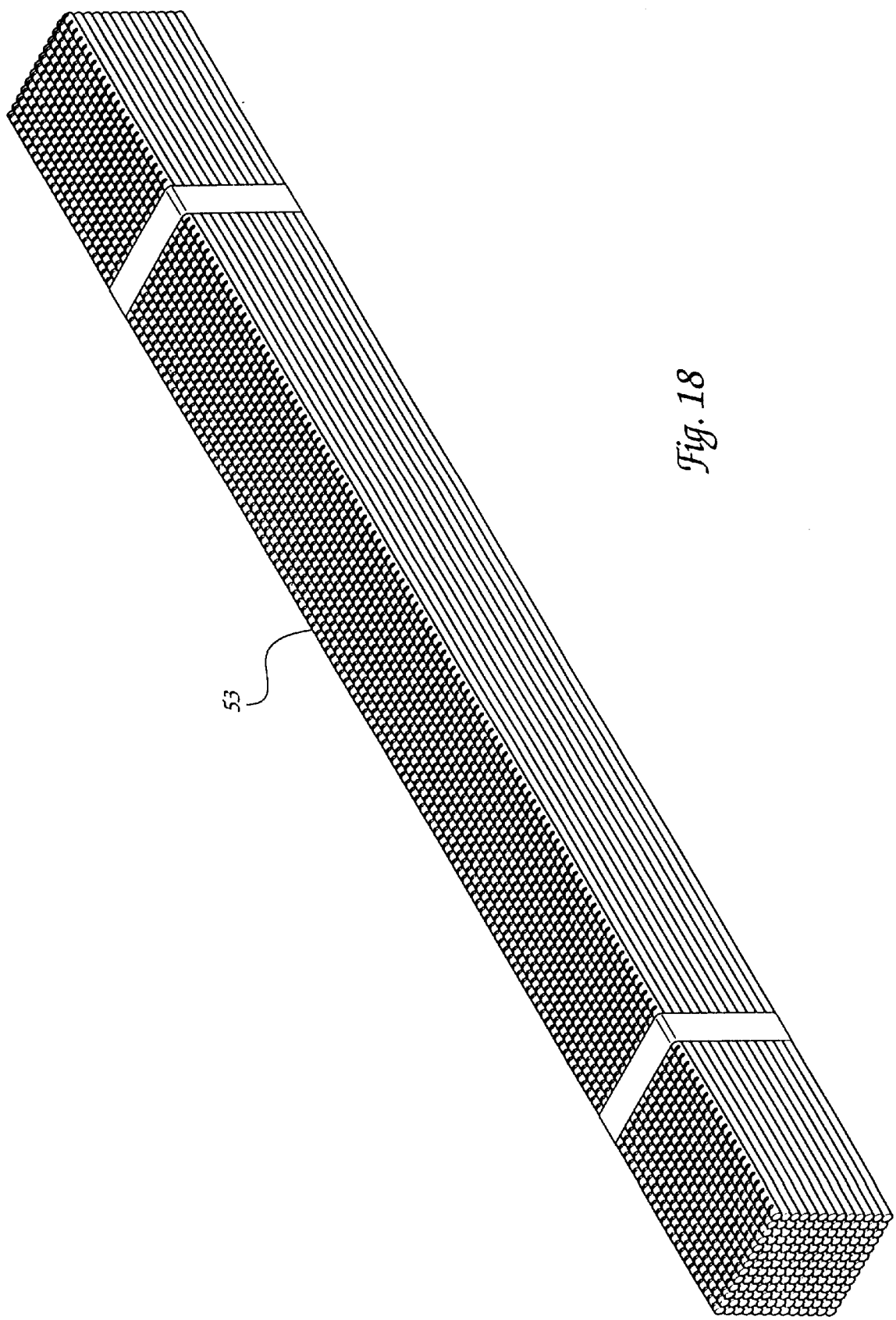
FIG. 18 is a perspective view of a bundle of rods of the present invention.
Figure 19:
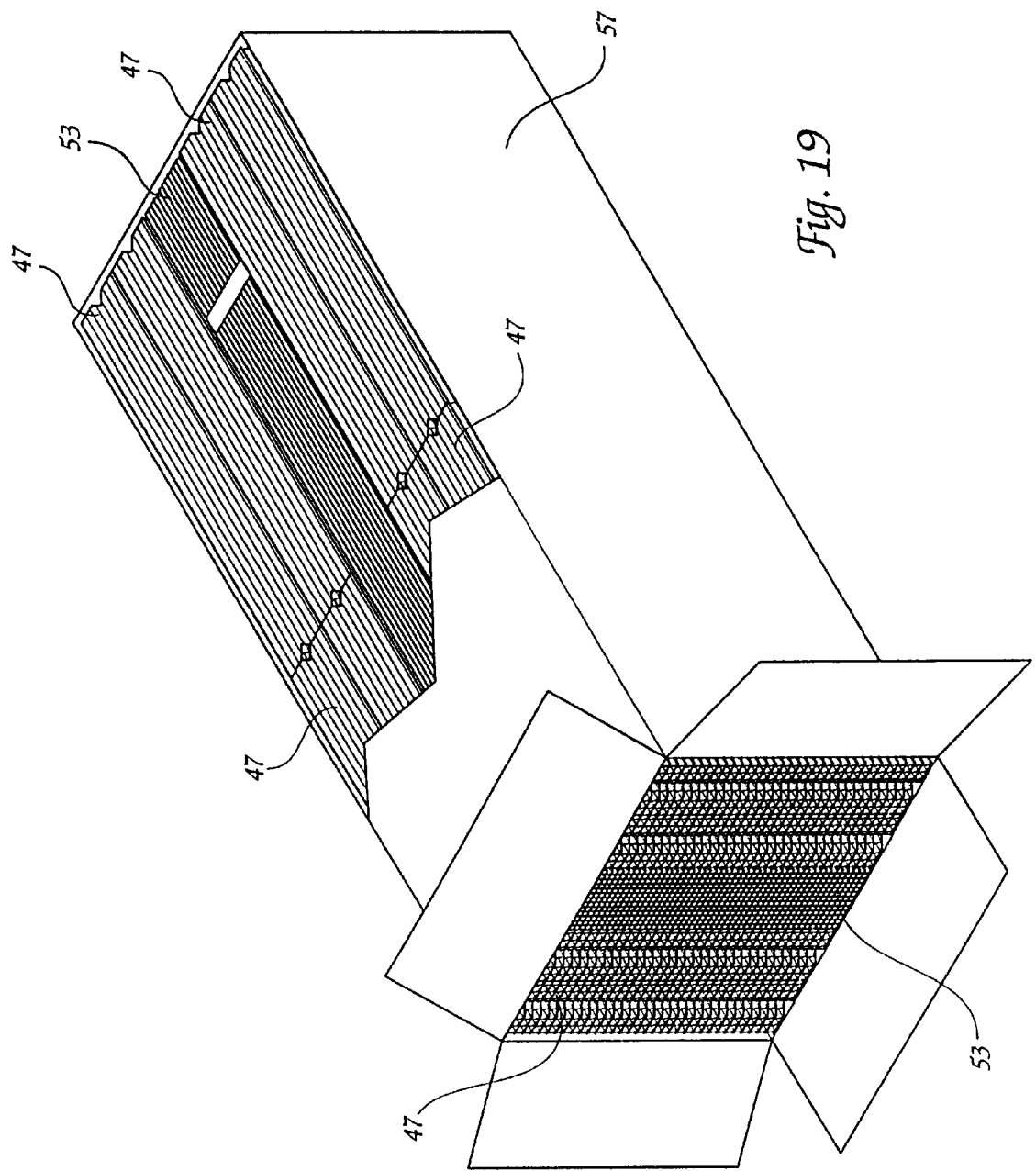
FIG. 19 is a perspective view of a set of rods and panels for assembling into marker stakes of the present invention, placed in a box for storage and transportation.

A number of rods assembled in a bundle 53 is shown in FIG. 18, while FIG. 19 shows the bundle 53 arranged with folded panel sheets 47 in box 57 for easy transportation. Typically, box 57 will be loaded with four folded sheets 47 comprising two hundred individual panels 23 or 46, and a bundle 53 consisting of two hundred rods 21. The weight of a box loaded in this manner is approximately twenty-three pounds.

Figure 5:
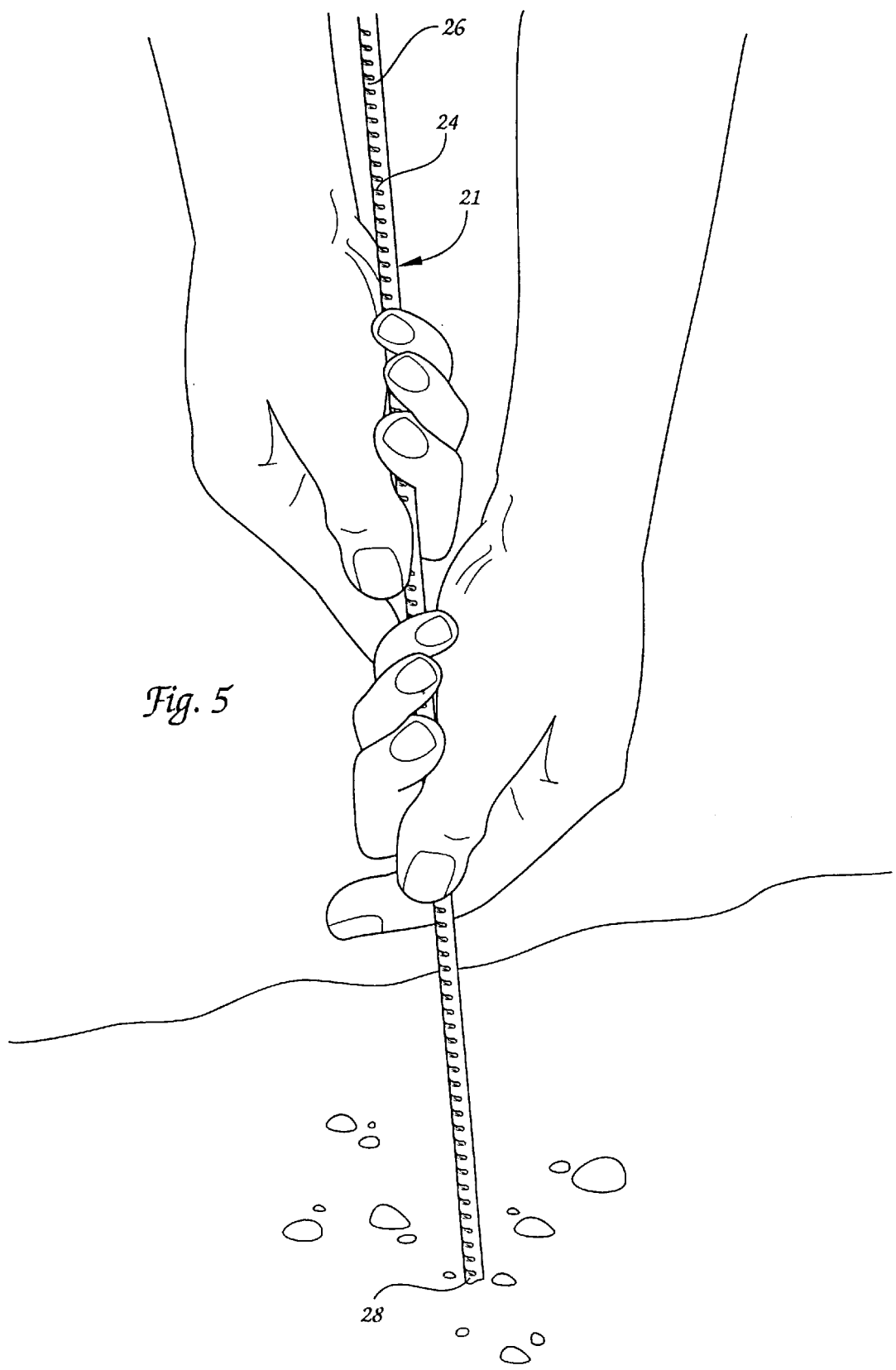
FIG. 5 is a perspective view of the rod of the marker stake of the present invention being installed by hand.

In use, a surveyor or engineer can easily insert rod 21 into the ground at a location to be marked, and then position panel 23 on rod 21 to complete the installation. Rod 21 is approximately one-eighth of an inch in diameter, and its cross-sectional area is therefore only approximately 0.05 in.$^2$, which results in rod 21 having the capability of easily penetrating the ground with little resistance. In most environments, rod 21 can be inserted into the ground by hand pressure alone, as shown in FIG. 5, while wooden stakes almost always require hammer blows to sufficiently drive them into the ground. The construction of rod 21 gives it sufficient rigidity and stability and allows it to be formed with a small cross-sectional area so that it can ordinarily penetrate the ground under hand pressure.

Where hand pressure is not sufficient to allow rod 21 to adequately penetrate the ground, a light hammer will in almost all cases drive the rod into the ground to securely anchor it. Rod 21 can be installed in asphalt in this manner, as shown in FIG. 6.

Figure 6:
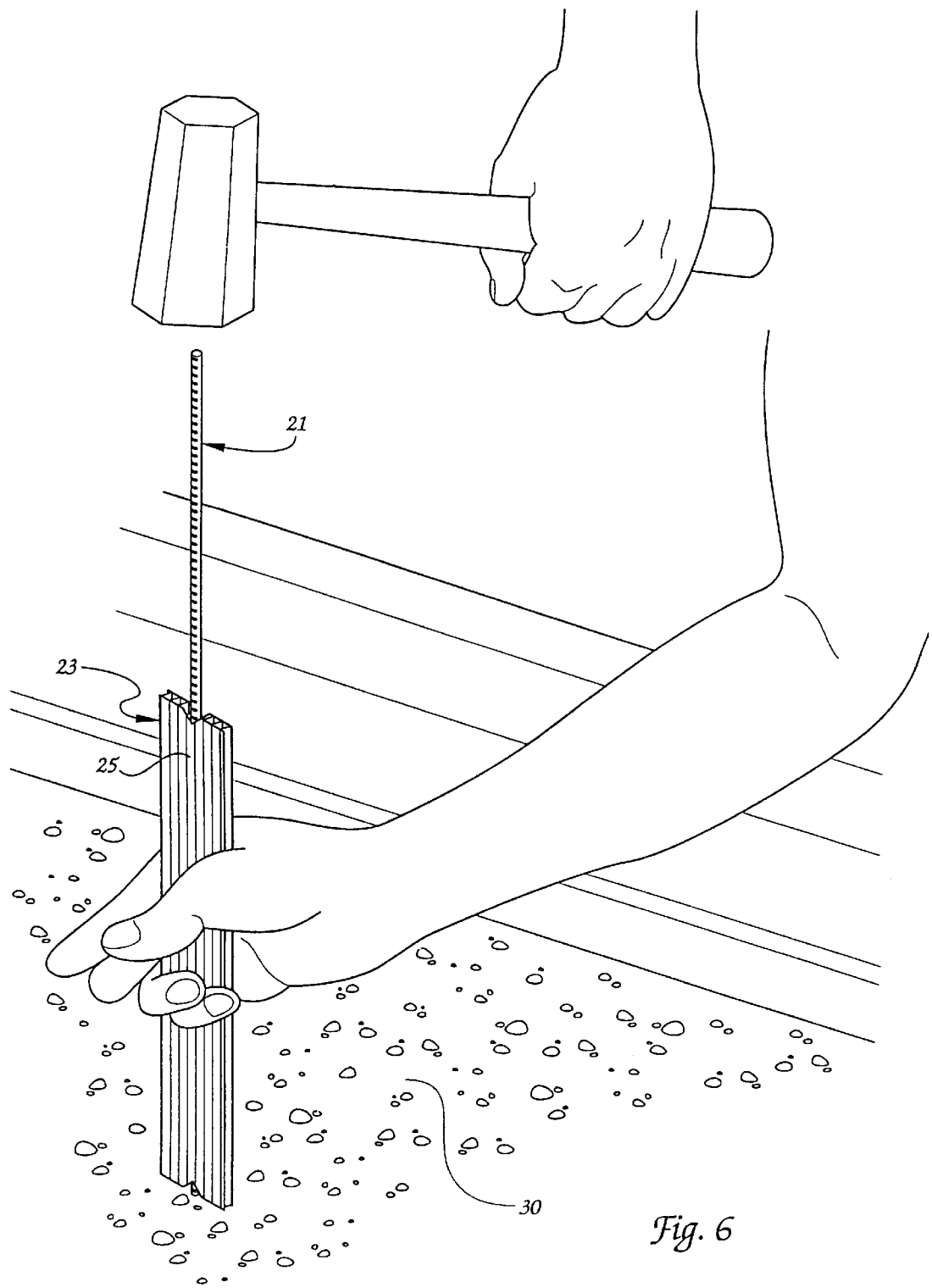
FIG. 6 is a perspective view of the marker stake of FIG. 1 being installed in an asphalt surface.

When using a hammer to drive in rod 21, the present invention allows a surveyor to position panel 23 on an asphalt surface 30 or the like so as to use panel 23 as a guide for rod 21, as shown in FIG. 6, thereby preventing deflection of rod 21 as it is being driven. By this arrangement the surveyor can also avoid having to position his or her hand at the top end of rod 21 to hold it for striking by the hammer, which significantly reduces the likelihood that an errant hammer blow will strike the surveyor's hand.

The flatness of flag faces 25 and the polypropylene composition of panel 23 provide excellent surfaces for writing information on the marker stake of the present invention. The surface of panel 23 may be corona-treated so that permanent marking ink, in particular, bonds well thereon, and elevation readings or other information can be written on the panel 23 so that the information is readily visible, even to grading equipment operators without dismounting. The marker stake of the present invention, despite its light weight and compact size, has a surface area available for writing thereon which is at least equal to the exposed surface area of typical wooden stakes. The present invention also has aspects which improve the safety of sites which have been marked with marker stakes. When installed, rod 21 is sheathed in panel 23, reducing the danger of a person falling on the marker stake. Moreover, while rod 21 has sufficient rigidity to form a highly stable marker stake, it will readily bend if fallen upon, and can readily be repositioned without requiring the point to be resurveyed, since the hole formed by insertion of the rod should not be disturbed. The present invention forms an extremely durable marker stake, in that rod 21 is composed of galvanized steel which is rust and corrosion-proof, while the polypropylene construction of panel 23 makes it waterproof and long-lasting. Wooden stakes, in comparison, have a far shorter usable life and are subject to rapid deterioration caused by a number of factors. Moreover, steel rod 21 can be detected by commonly used metal detectors in the event rod 21 should be buried.

As noted above, it may be advantageous to assemble a marker stake which consists of two or more panels and rods to make the marker stake larger. Such a stake may be assembled by inserting a first rod 21 in channel 27" of a first panel 23, and inserting an end of a second rod 35 in channel 27', with the other end of the second rod 35 projecting upward to be received in channel 39' of a second panel 37. Additional panels and rods can be added to create marker stakes of even greater height, with up to five panels being spliced together before the stake begins to lose rigidity. The panels are oriented, when joined together, with their flag faces at right angles and their notches interlocked for stability, as shown in FIGS. 7 and 9, which also provides a three-dimensional marker easier to see from all angles.

For stakes which include two spliced-together panels, one end of a first rod 21 may be inserted in channel 27' of a first panel 23 so that it does not occupy the entire extent of channel 27', and a second rod 35 can be inserted in the remaining extent of channel 27' so that a portion of the longitudinal extent of the second rod 35 projects upward to be received in channel 39' of a second panel 37, thereby forming a marker stake having two panels and two rods.

The present invention also allows large numbers of marker stakes to be carried by hand over distances, which permits a long survey to continue to completion without requiring the stake supply to be replenished. A box of the marker stakes of the present invention, packed as shown in FIG. 19, contains a bundle of rods 53 and folded panels 47 for 200 marker stakes, yet weighs only approximately 23 pounds. A comparable number of wooden stakes would weigh approximately 270 pounds. Experimentation has indicated that a surveyor's assistant can often carry two boxes of the marker stakes of the present invention, containing 400 marker stakes which would weigh approximately 46 pounds, while 400 wooden stakes would weigh over 540 pounds.

Transportation and handling of the marker stakes of the present invention are also made easier by the joining of panels in sheet 47, as shown in FIG. 11, so that sheet 47 can be folded in an accordion-fold arrangement for compact storage and handling, as shown in FIG. 14. The joining of panels 46 by tabs 49 and perforated portions 51 at the lateral edge joints of panels 46 permits the aforementioned accordion-folding of sheet 47, so that panels 46 remain joined and do not scatter loosely, yet can be easily detached when needed. Folding of sheet 47 typically causes either tabs 49 or perforated portions 51 to become separated when they are on the outer side of the fold, while the tab 49 or perforated portion 51 on the inside of the fold remains attached, as shown in FIGS. 16 and 17, thereby holding panels 46 together in their folded disposition. As noted above, some continued attachment of tabs 49 or perforated portions 51 on the outside edge of the fold does not impede folding of panels 46.

In use, a surveyor would simply open box 57, remove a rod 21, tear off a panel 46 from folded sheet 47, and assemble the marker stake for insertion at a point to be marked. Box 57 can then be readily carried to the next location to be marked.

The unique advantages of the present invention result in a significant reduction in the time required to mark locations for surveying, construction, or other purposes. The marker stake of the present invention is easily and quickly installed by hand under most conditions, and can be installed in hard ground or asphalt with a light hammer, while the requirement of flagging is eliminated entirely. Large numbers of the marker stake may be carried over long distances, eliminating time-consuming trips to replenish supplies of wooden stakes. Moreover, the marker stake of the present invention provides a highly visible and long lasting marker which is superior in performance to the wooden stake.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A marker stake for marking a location, comprising:
   first and second elongate wire-like rods each having two ends, said first rod insertable into the ground at a location to be marked;
   first and second pre-sized panels each having a pair of flag faces and an open-ended longitudinal channel dimensioned in cross-section to be capable of receiving in friction fit a portion of the longitudinal length of said first rod or said second rod, said panels each having two longitudinal ends in generally parallel orientation, each of said longitudinal ends having a notch formed therein, said notches being centered on said channel; and
   said first panel for receiving a portion of said first rod and a portion of said second rod in said channel, said second panel for receiving a portion of said second rod in said channel, said first panel and said second panel disposed adjacent at respective longitudinal ends thereof with their said flag faces in right angle orientation with respect to each other about said second rod; said first panel and said second panel being retained in right angle orientation by interengagement of the notches in the adjacent ends thereof.

2. The marker stake of claim 1, in which said pair of flag faces of each panel are separated by two or more spacers in generally parallel orientation, and said spacers define said channel.

3. A marker stake for marking a location, comprising:
   first and second elongate wire-like rods each having two ends, said first rod partially insertable into the ground at a location to be marked;
   first and second pre-sized panels each having a pair of flag faces and at least two longitudinal channels dimensioned in cross-section to be capable of receiving in friction fit a portion of the longitudinal length of said first rod or said second rod, said panels each having two longitudinal ends in generally parallel orientation, each of said longitudinal ends having a notch formed therein and centered on one of said channels; and
   said first panel for receiving a portion of said first rod in one of said channels and a portion of said second rod in another of said channels, said second panel for receiving a portion of said second rod in one of said channels, said first panel and said second panel disposed adjacent at respective longitudinal ends thereof with their said faces in right angle orientation with respect to each other about said second rod; said first panel and said second panel being retained in right angle orientation by interengagement of the notches in the adjacent ends thereof.

4. The marker stake of claim 3, in which said pair of flag faces of each panel are separated by at least three spacers in generally parallel orientation, and said spacers define said at least two channels.

5. A set of rods and panels for assembling into marker stakes for marking locations, comprising:
   a bundle of individual straight rods each insertable into the ground at a location to be marked, each said rod including a plurality of gripping projections spaced along its length; and
   a sheet of a plurality of panels folded in accordion fashion, each said panel having a pair of flag surfaces separated by a plurality of spacers which define an open-ended channel having a cross-section dimensioned to receive a said rod in frictional gripping resistance between said channel and said gripping projections sufficient to support said panel at a vertical spacing above the ground, said panels being joined together only at lateral sides thereof by spaced separable connecting elements for easy separation of said panels for disposing said panels individually on said rods to form marker stakes;
   wherein each said panel includes a sighting notch comprising an opening into said channel formed in a said flag surface thereof for viewing of a said rod when disposed in said channel.

6. A method of inserting a marker stake in the ground at a location, comprising the steps of:
   providing a rod having a ground insertable end and a sighting end;
   providing a panel having a pair of flag surfaces separated by two spacers which define an open-ended channel dimensioned in cross-section for receiving therein said rod in frictional gripping resistance therewith sufficient to support the panel at a vertical spacing to the ground solely by said frictional gripping resistance;
   inserting the rod in the channel and slidably disposing the panel at the ground insertable end of the rod;
   positioning the rod with its ground insertable end at the location to be marked;
   partially inserting the rod into the ground at the location to firmly anchor the rod in the ground while bracing the rod against deflection with the panel in abutment with the ground;
   sliding the panel along the anchored rod to position the panel at the vertical spacing to the ground; and
   retaining the panel in the position solely by the frictional gripping resistance.

7. A method of inserting a marker stake in the ground at a location for sighting thereon, comprising the steps of:
   providing a rod having a ground insertable end and a sighting end;
   providing a panel having a pair of flag surfaces separated by two spacers which define an open-ended channel dimensioned in cross-section for receiving the rod therein with frictional gripping resistance therewith sufficient to support the panel at a vertical spacing to the ground, the panel including a sighting notch comprising an opening into said channel formed in a said flag surface;
   positioning the rod with its ground insertable end at a location;
   partially inserting the rod into the ground at the location to firmly anchor the rod in the ground;
   sliding the panel along the anchored rod to position the sighting end of the rod within the opening of the sighting notch of the panel for sighting thereon; and retaining the panel in the position solely by the frictional gripping resistance.

8. A method of inserting a marker stake in the ground at a location, said marker stake including first and second elongate wire-like rods, said first rod having a ground insertable end and an opposite end, said second rod having an insertable end and a sighting end, and first and second pre-sized panels each having a pair of flag faces, two or more open-ended longitudinal channels dimensioned in cross-section for receiving in friction fit a portion of the longitudinal length of one of said rods, and two longitudinal ends in generally parallel orientation, each of said longitudinal ends having a notch formed therein and centered on one of said channels, said method comprising the steps of:

inserting said first rod in said one of said channels of said first panel;

positioning said first rod with its ground insertable end at said location;

partially inserting said first rod into the ground at said location to firmly anchor said rod in the ground;

positioning said first panel at said opposite end of said first rod; and inserting said insertable end of said second rod in another of said channels of said first panel and said sighting end of said second rod in said one of said channels of said second panel and disposing said second panel in right angle orientation with respect to said first panel about said second rod with the notches of the adjacent ends of said first panel and said second panel being in interengagement to retain said first and second panels in right angle orientation.

9. A marker stake for marking a location, comprising:

a rod insertable partially into the around at a location to be marked, said rod including a plurality of gripping projections spaced along its length; and a panel having a pair of flag surfaces separated by a plurality of spacers, said spacers defining an open-ended channel having a cross-section dimensioned to receive said rod therein in frictional gripping resistance between said channel and said gripping projections, said rod extending within said channel and supporting said panel at a vertical spacing above the ground solely by said frictional gripping resistance;

wherein said gripping projections also serve to frictionally retain said rod within the ground.

10. A marker stake for marking a location, comprising:

a rod insertable partially into the ground at a location to be marked, said rod including a plurality of gripping projections spaced along its length; and a panel having a pair of flag surfaces separated by a plurality of spacers, said spacers defining an open-ended channel having a cross-section dimensioned to receive said rod therein in frictional gripping resistance between said channel and said gripping projections, said rod extending within said channel and supporting said panel at a vertical spacing above the around solely by said frictional gripping resistance;

wherein said panel includes a sighting notch comprising an opening into said channel formed in a said flag surface thereof for viewing of a said rod disposed in said channel.

11. A set of rods and panels for assembling into marker stakes for marking locations, comprising:

a bundle of individual straight rods each insertable into the ground at a location to be marked, each said rod including a plurality of gripping projections spaced along its length; and a sheet of a plurality of panels folded in accordion fashion, each said panel having a pair of flag surfaces separated by a plurality of spacers which define an open-ended channel having a cross-section dimensioned to receive a said rod in frictional gripping resistance between said channel and said gripping projections sufficient to support said panel at a vertical spacing above the ground, said panels being joined together only at lateral sides thereof by spaced separable connecting elements for easy separation of said panels for disposing said panels individually on said rods to form marker stakes;

wherein said gripping projections also serve to frictionally retain said rod within the ground.

* * * * *